United States Patent
Wu

(10) Patent No.: US 8,366,140 B2
(45) Date of Patent: Feb. 5, 2013

(54) COLLAPSIBLE GOLF TROLLEY

(75) Inventor: Fang-Li Wu, Tainan (TW)

(73) Assignee: Sports World Enterprise Co., Ltd., Tainan Hsien (TW)

(*) Notice: Subject to any disclaimer, the term of this patent is extended or adjusted under 35 U.S.C. 154(b) by 377 days.

(21) Appl. No.: 12/847,094

(22) Filed: Jul. 30, 2010

(65) Prior Publication Data

US 2012/0025481 A1    Feb. 2, 2012

(51) Int. Cl.
*B62B 3/02* (2006.01)
(52) U.S. Cl. .................................. 280/651; 280/DIG. 6
(58) Field of Classification Search ................... 280/651, 280/DIG. 6
See application file for complete search history.

(56) References Cited

U.S. PATENT DOCUMENTS

| | | | |
|---|---|---|---|
| 5,180,184 A * | 1/1993 | Chiu | 280/646 |
| 5,201,540 A * | 4/1993 | Wu | 280/646 |
| 6,079,718 A * | 6/2000 | Liao | 280/47.26 |
| 6,152,463 A * | 11/2000 | Wu | 280/47.17 |
| 6,969,078 B2 * | 11/2005 | Liao | 280/38 |
| 7,137,644 B2 * | 11/2006 | Kimberley | 280/651 |
| 7,213,830 B2 * | 5/2007 | Liao | 280/651 |
| 7,552,931 B2 * | 6/2009 | Liao | 280/47.34 |
| 7,862,053 B2 * | 1/2011 | Liao | 280/47.34 |
| 7,866,685 B2 * | 1/2011 | Liao | 280/651 |
| 8,191,920 B2 * | 6/2012 | Zhang | 280/651 |
| 8,226,112 B2 * | 7/2012 | Liao | 280/651 |
| 2010/0090443 A1 * | 4/2010 | Liao | 280/651 |
| 2012/0112436 A1 * | 5/2012 | Liao | 280/651 |

* cited by examiner

*Primary Examiner* — Jeffrey J Restifo
(74) *Attorney, Agent, or Firm* — Rosenberg, Klein & Lee

(57) ABSTRACT

A collapsible golf trolley is revealed. A connection assembly that connects an upper frame, a lower frame, and mounts on two sides includes a locking body locked on a metal rod so as to improve the fastening strength. The connection assembly is further arranged with a guiding wheel corresponding to a guiding slot of a lower frame. This design makes the operation smoother while extending and folding the lower frame. Moreover, a turning member for turning and folding of a front wheel is disposed on a front end of the lower frame. According to the above structure, easy spreading and collapsing and firm connection of the golf trolley are achieved.

3 Claims, 17 Drawing Sheets

COLLAPSIBLE GOLF TROLLEY

BACKGROUND OF THE INVENTION

1. Fields of the Invention

The present invention relates to a collapsible golf trolley, especially to a golf trolley that includes a metal connection part with certain strength, a turning member with easy operation and a guiding wheel set with smooth operation so as to achieve smooth operation and firm stability.

2. Descriptions of Related Art

As disclosed in Taiwanese Pub. App. No. 351095, a golf trolley consists of a lower frame, an upper frame, mounts, a bar, a rod, a front wheel, and a fastening member. The lower frame consists of a connection plate on a top, a golf bag base on a bottom thereof, and a sliding block. A lower end of the upper frame is pivoted to the connection plate. The mount connected with a rear wheel on a rear end thereof is fixed on each of two sides of the connection plate so as to form a pyramid together with the lower frame. The bar connects the upper frame with the sliding block so that the upper frame and the sliding block move together while the rod connects the sliding block with the mount so as to form a linkage between the sliding block and the mount. The front wheel is disposed under the golf bag base and the front wheel can be extended to straight condition by a foldable joint. The fastening member includes a fastening body pivoted to the top of the sliding block so as to fasten the upper frame and the lower frame firmly with each other. In accordance with the above structure, while collapsing the golf trolley, the fastening member is released, the upper frame and the lower frame are folded, attached to each other and the front wheel is moved to straight condition. When the golf trolley is opened up, by the movement of the bar, the sliding block, the rod and the mounts, the sliding block slides towards the connection plate and the upper frame is fastened with the lower frame by the fastening member. At the same time, the rear wheel is extended.

However, the above structure has following disadvantages:

1. The foldable joint includes a main body whose top end is connected to another joint that is connected to the lower frame. Thus the lower frame and the front wheel are collapsible. The main body is arranged with a U-shaped locking slot and a sleeve whose top end is with a locking rod and bottom end is connected to a wheel frame. A spring is wrapped around the sleeve. Thus the main body is extended first and then turned for folding and storage. Such design is with poor stability.
2. Moreover, as shown in FIG. 17, the fastening member 9 further consists of a fastener 91, a torsion spring 92 pivoted on top of a sliding block B on a middle part hereof, a push snap button 93 on one end, a locking hook 94 on the other end thereof, and a protruding locking block 95 arranged at a connection plate A. Both the locking block 95 and the locking hook 94 are made from plastic so as to have certain elasticity. After being used for a period of time or being applied with a force, the locking block 95 and the locking hook 94 are easily deformed and unable to be locked, even got broken.
3. A slot 901 corresponding to the sliding block B is mounted on each of two sides of a lower frame 90. Due to surface contact, a friction force between the sliding block B and the slot 901 is quite large. Moreover, sunlight exposure or other environmental factors may results in deformation. Thus the operation is not smooth while spreading and collapsing the trolley.

SUMMARY OF THE INVENTION

Therefore, it is a primary object of the present invention to provide a collapsible golf trolley that makes extending and folding of the golf trolley become smoother. Moreover, the connection of the golf trolley is with higher stability.

In order to achieve above object, a connection part that connects an upper frame, a lower frame, and mounts on two sides includes a locking body locked on a metal rod so as to increase the strength of the fastening. The connection part is disposed with a guiding wheel corresponding to each guiding slot of a lower frame so that the extending and folding of the lower frame are smoother. Moreover, a turning member for turning and folding of a front wheel is arranged at a front end of the lower frame.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
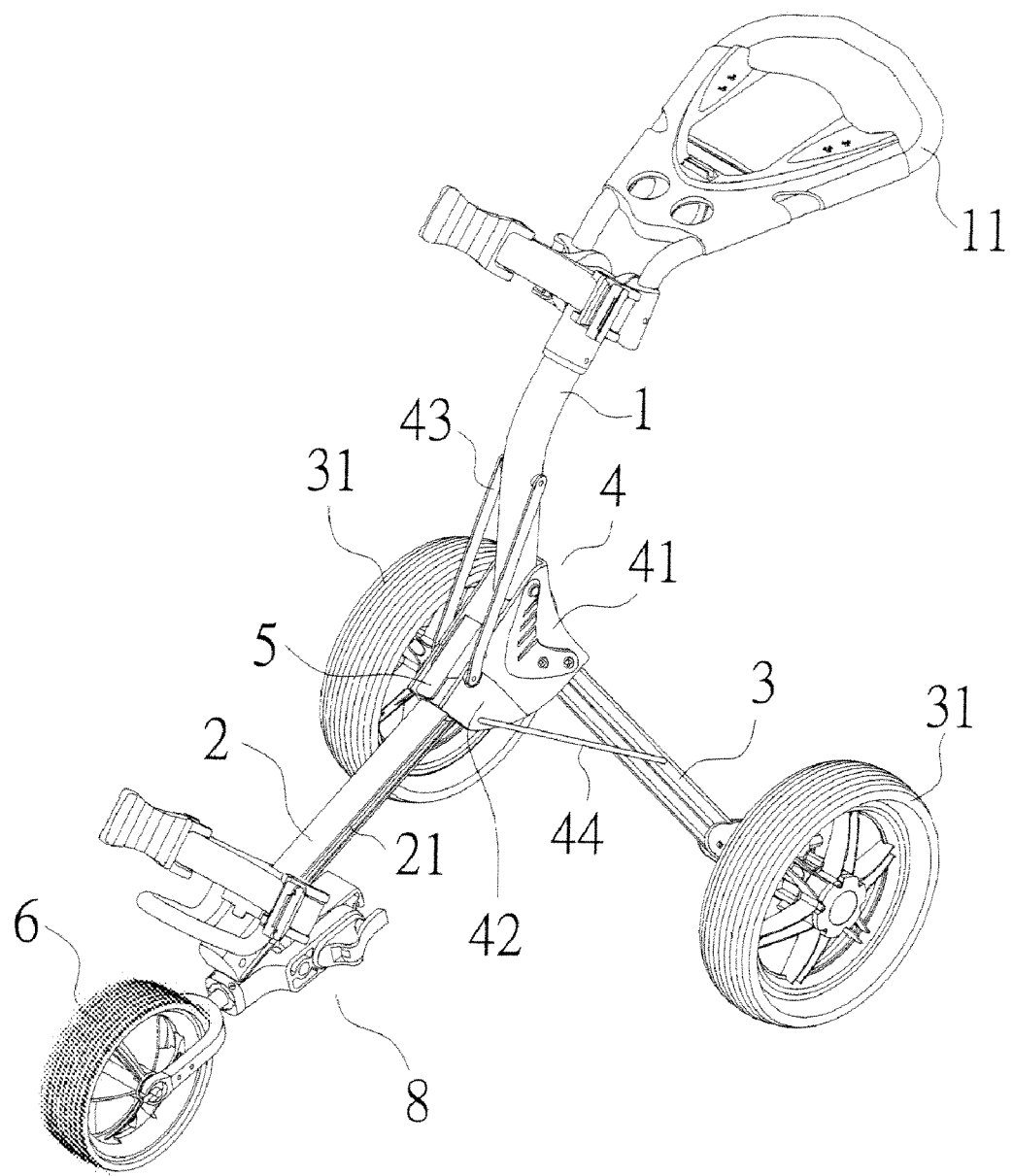
FIG. 1 is a perspective view of an embodiment according to the present invention.
Figure 2:
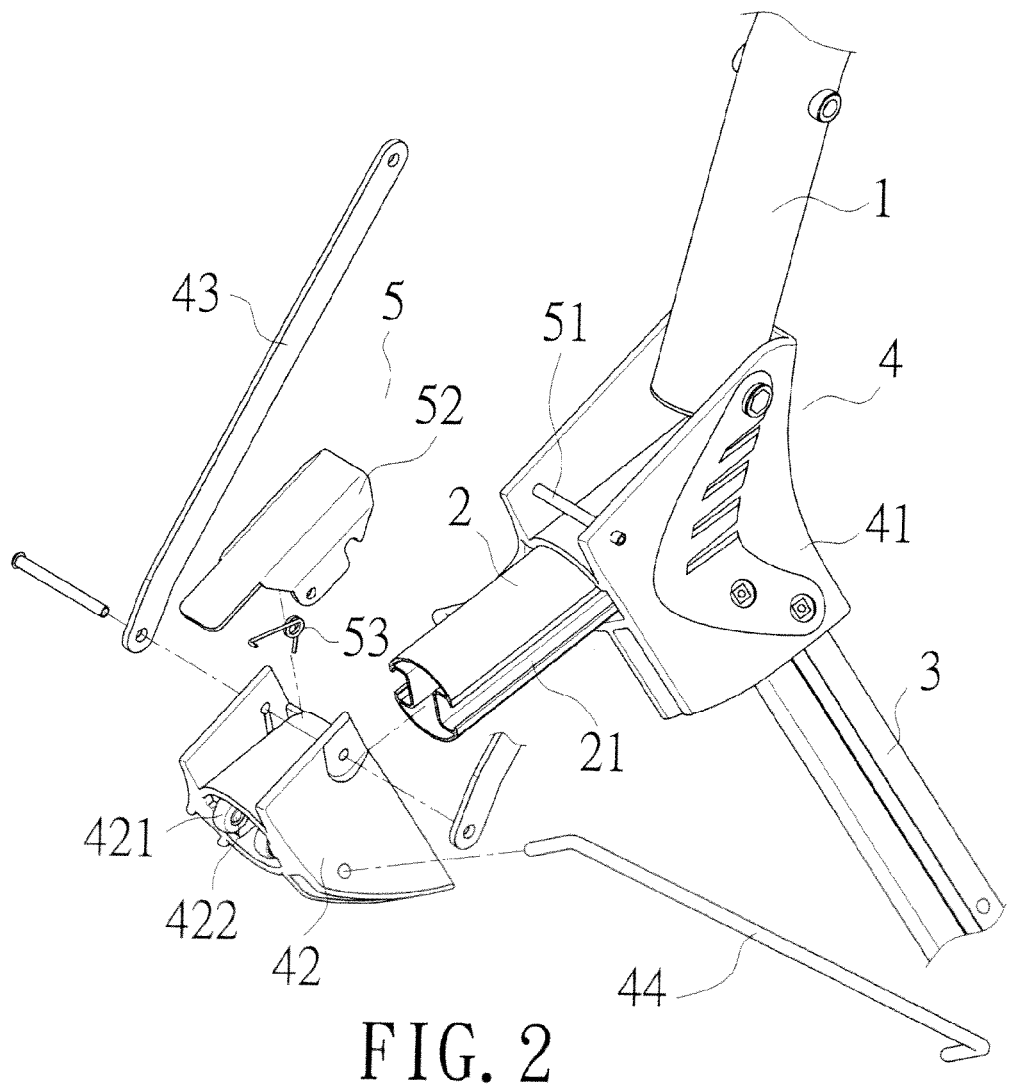
FIG. 2 is an explosive view of connection parts of an embodiment according to the present invention.
Figure 3:
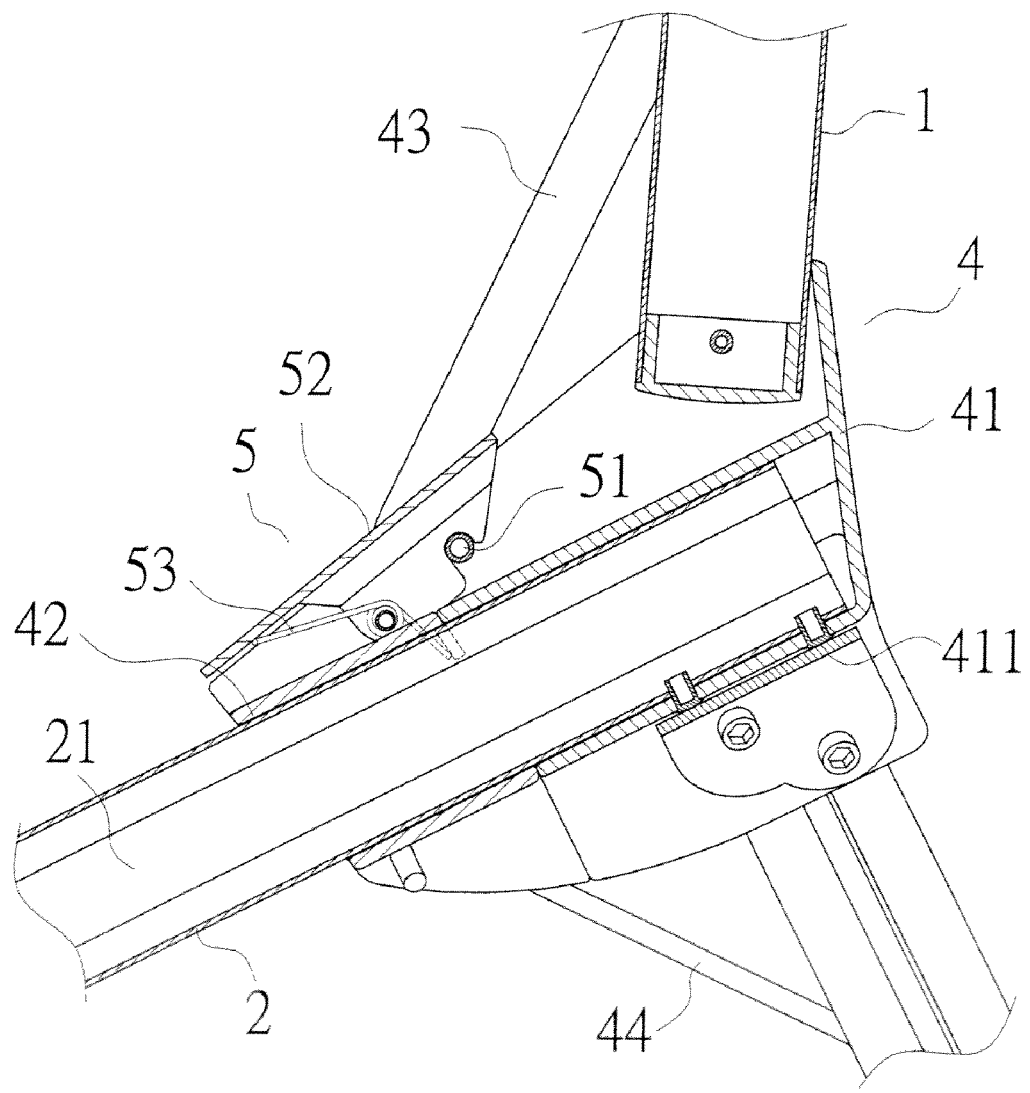
FIG. 3 is a schematic drawing showing a cross section of connection parts in a fastened state according to the present invention.
Figure 4:
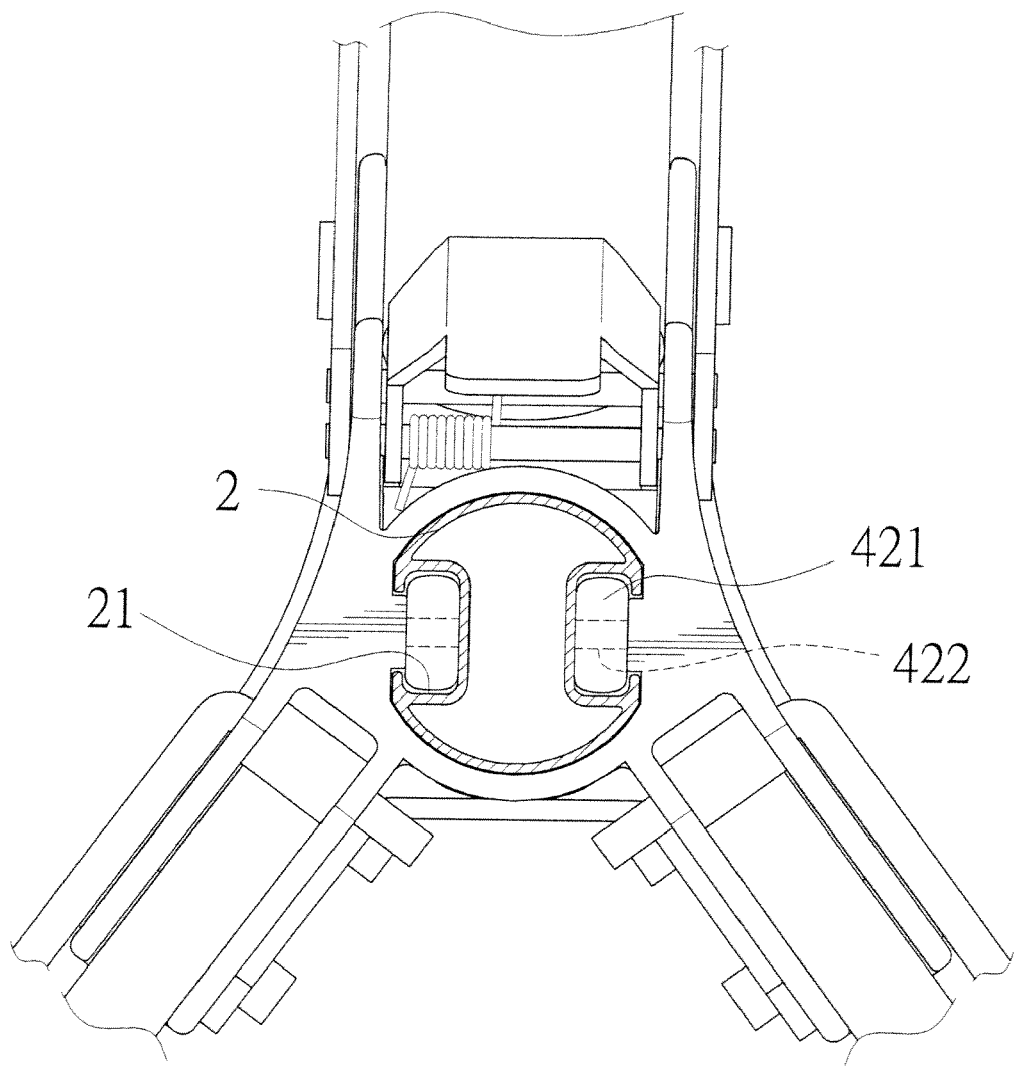
FIG. 4 is a schematic drawing showing a cross section of a guiding wheel according to the present invention.
Figure 5:
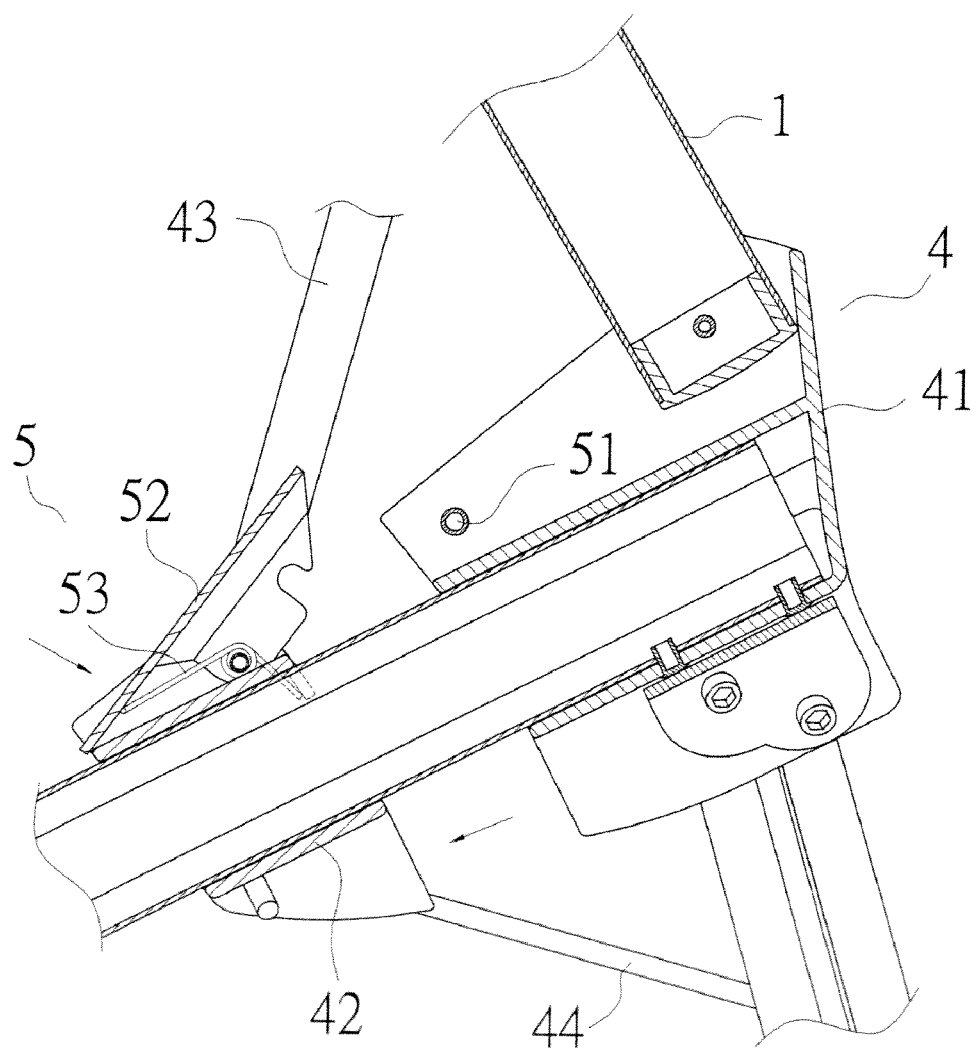
FIG. 5 is a schematic drawing showing a cross section of connection parts in a released state according to the present invention.

Refer from FIG. 1 to FIG. 4 and FIG. 6, a golf trolley folding part according to the present invention includes: an upper frame 1, a lower frame 2, two mounts 3, a linkage 4, a fastener 5, a front wheel 6, a turning member 7, and a bending member 8.

The upper frame 1 is assembled with a handle 11 on a top end thereof.

The lower frame 2 is arranged with two guiding slots 21 on a surface thereof and the bending member 8 is disposed on a rear end of the lower frame 2.

The mount 3 is disposed on each of two sides and each mount 3 is arranged with a side wheel 31.

The linkage 4 is composed of a connection base 41 pivoted with the upper frame 1 as well as mounts 3 on two sides and inserted with the lower frame 2, a connection block 42 assembled on the lower frame 2 and connected with two guiding wheels 421 by a shaft 422, a pair of bars 43 whose two ends are respectively pivoted on each of two sides of the upper frame 1 and each of two sides of the connection block 42 respectively, and a pair of moveable linkage parts 44 that are assembled between two sides of the connection block 42 and two sides of the mount 3. The guiding wheel 421 is moveable and sliding in each guiding slot 21 of the lower frame 2 correspondingly.

The fastener 5 includes a metal rod 51 penetrated and assembled with the connection base 41, a locking body 52 pivoted on the connection block 42 together with an elastic part 53. The locking body 52 is locked on the metal rod 51 correspondingly so as to connect the connection base 41 with the connection block 42.

Figure 6:
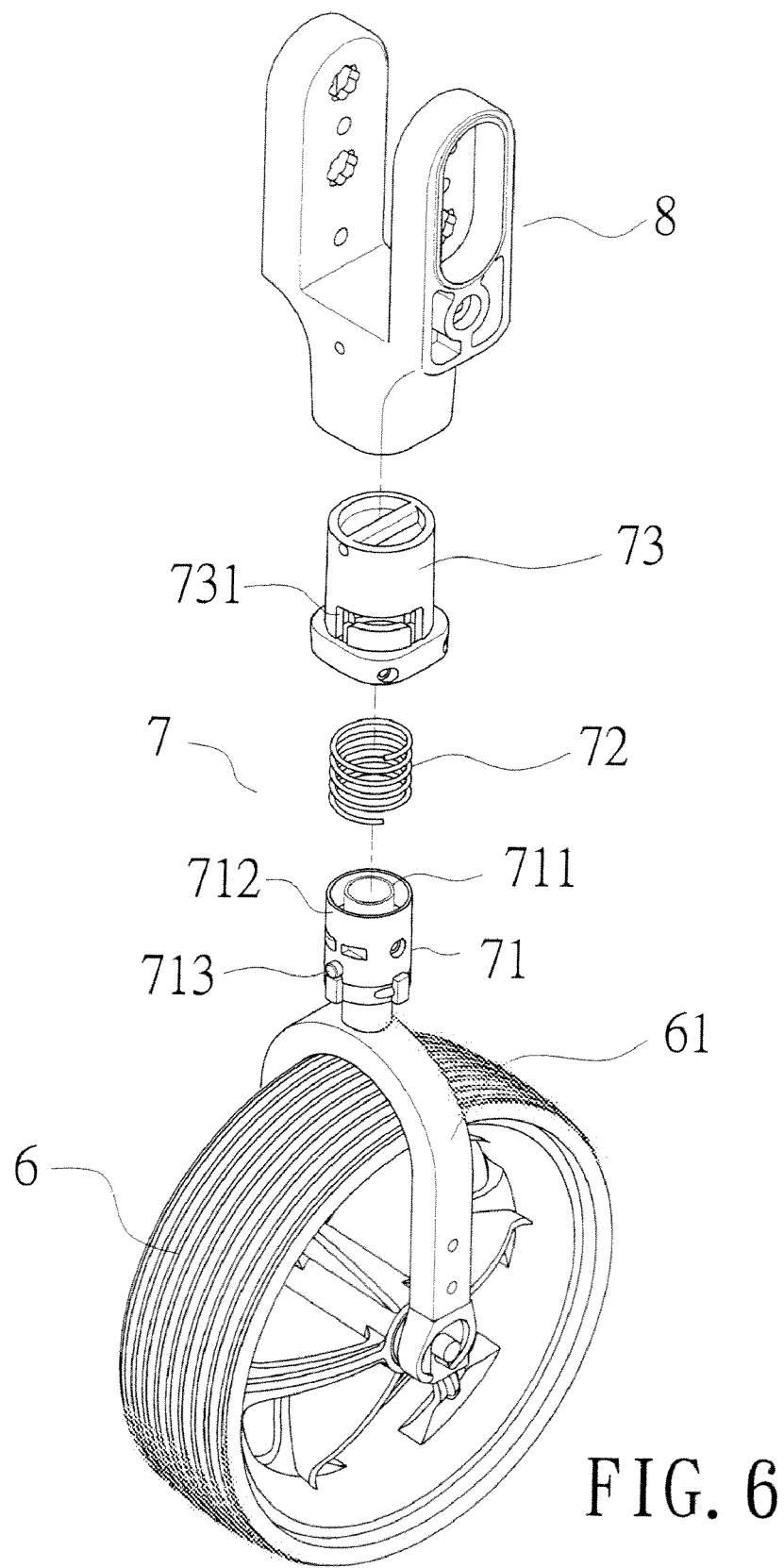
FIG. 6 is an explosive view of a turning part of an embodiment according to the present invention.
Figure 7:
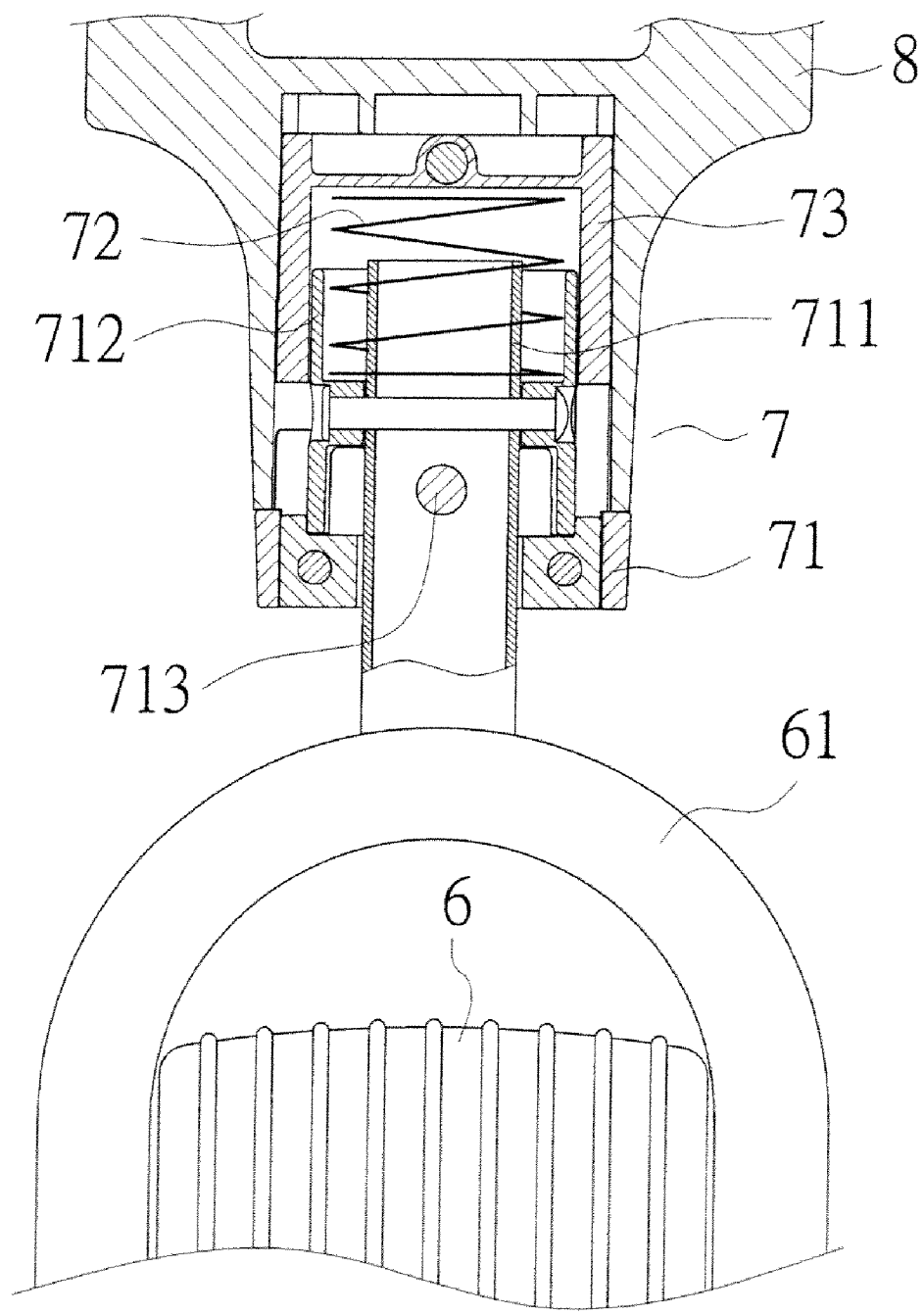
FIG. 7 is a schematic drawing showing a cross section of a turning part of an embodiment according to the present invention.
Figure 8:
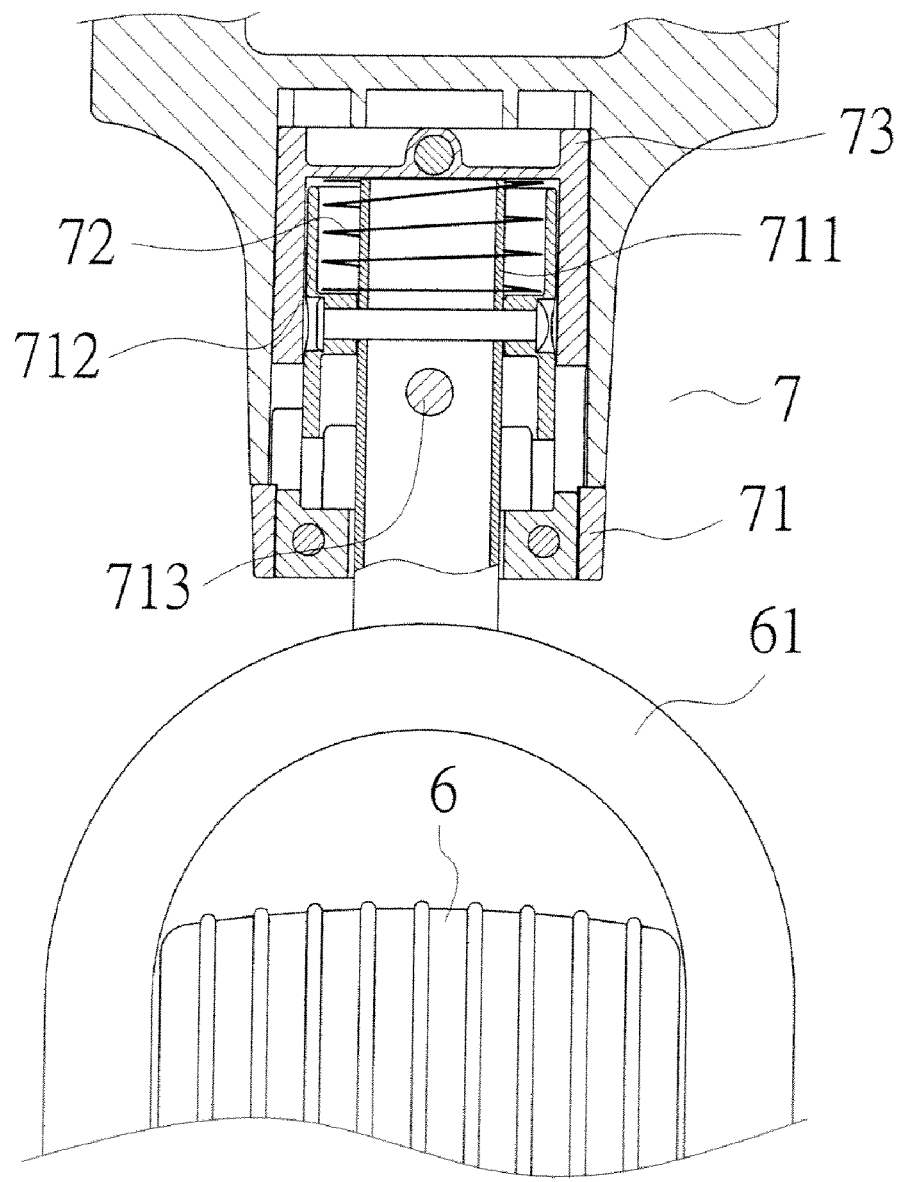
FIG. 8 is a schematic drawing showing a cross section of a turning part in action according to the present invention.
Figure 9:
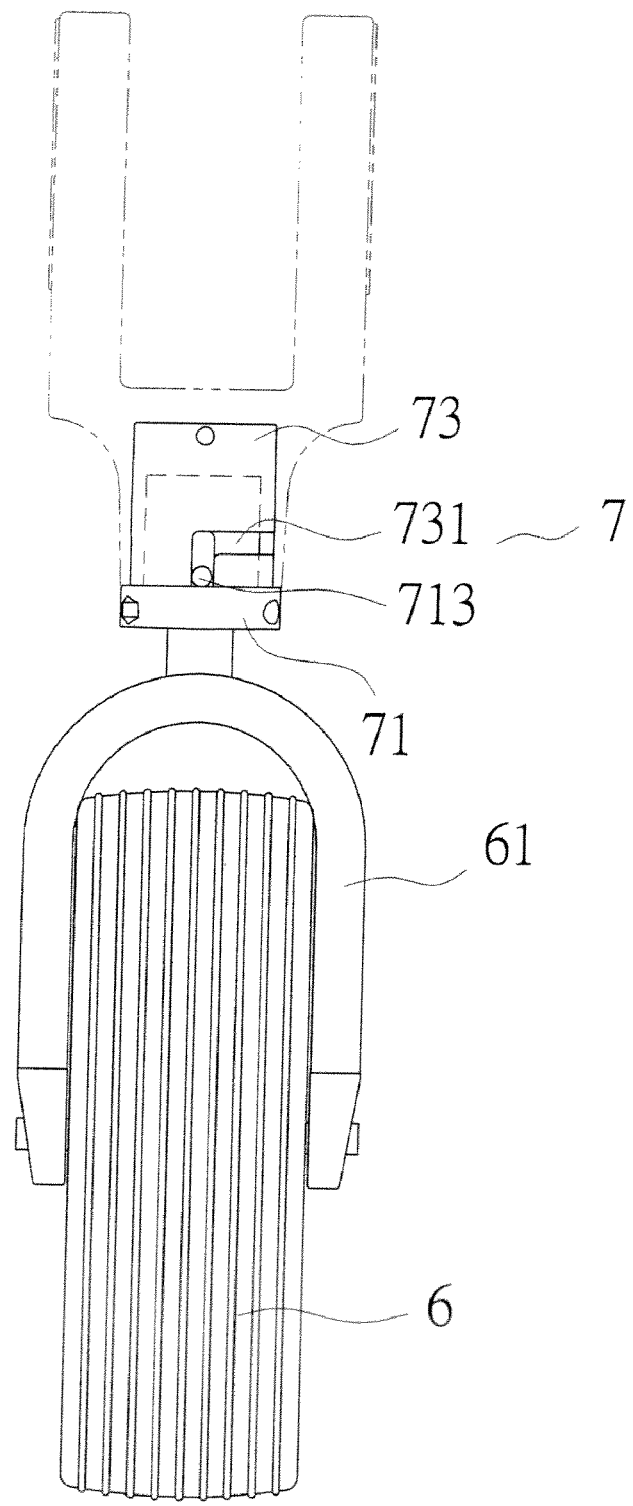
FIG. 9 is a schematic drawing showing a turning action of an embodiment according to the present invention.

As shown in FIG. 6, the front wheel 6 is assembled with a corresponding fork 61. The foldable front wheel 6 is turned by a turning member 7 to be folded while a top end of the front wheel 6 is connected to the bending member 8.

The turning member 7 consists of a shaft base 71 disposed on the fork 61 of the front wheel 6, an elastic body 72, and a sleeve base 73 sleeved over the shaft base 71. The shaft base 71 includes an inner tube 711 and an outer tube 712 arranged with a pair of locking protrusions 713 on a tube wall thereof. The elastic body 72 is disposed between the inner tube 711 and the outer tube 712. The sleeve base 73 is set with a pair of turning guiding slots 731 each corresponding to one locking protrusion 713 so that the locking protrusion 713 slide and turn in the turning guiding slot 731. The sleeve base 73 is connected to the bending member 8.

Refer from FIG. 1 to FIG. 5, while in use, the golf trolley is in an extended state. The connection base 41 of the linkage 4 is pivoted to and connected with the upper frame 1 as well as the mount 3 on each of two sides. The lower frame 2 is assembled with the connection block 42 and then is inserted into the connection base 41. Two ends of the bar 43 are respectively pivoted to and connected with the upper frame 1 and the connection block 42. As to the linkage part 44, it's connected to the connection block 42 and is sliding from the connection block 42 toward the mount 3 on two sides. The guiding wheel 421 of the connection block 42 that is corresponding to the guiding slot 21 of the lower frame 2 is sliding and moved toward the connection base 41. Thus the locking body 52 pivoted on the connection block 42 is locked on the metal rod 51 on the connection base 41 correspondingly and the connection base 41 is connected and fastened with the connection block 42. The upper frame 1 and the lower frame 2 are fastened and located firmly by each other. While being folded, unlock the locking body 52 and the locking body 52 is released from the metal rod 51. Then the upper frame 1 and the lower frame 2 are folded. The guiding wheel 421 of the connection block 42 is sliding in the guiding slot 21 of the lower frame 2 and is moving toward the front wheel 6 while connection block 42 is connected with the upper frame 1 by the bar 43. Therefore, the upper frame 1 and the lower frame 2 are folded, facing each other.

Figure 10:
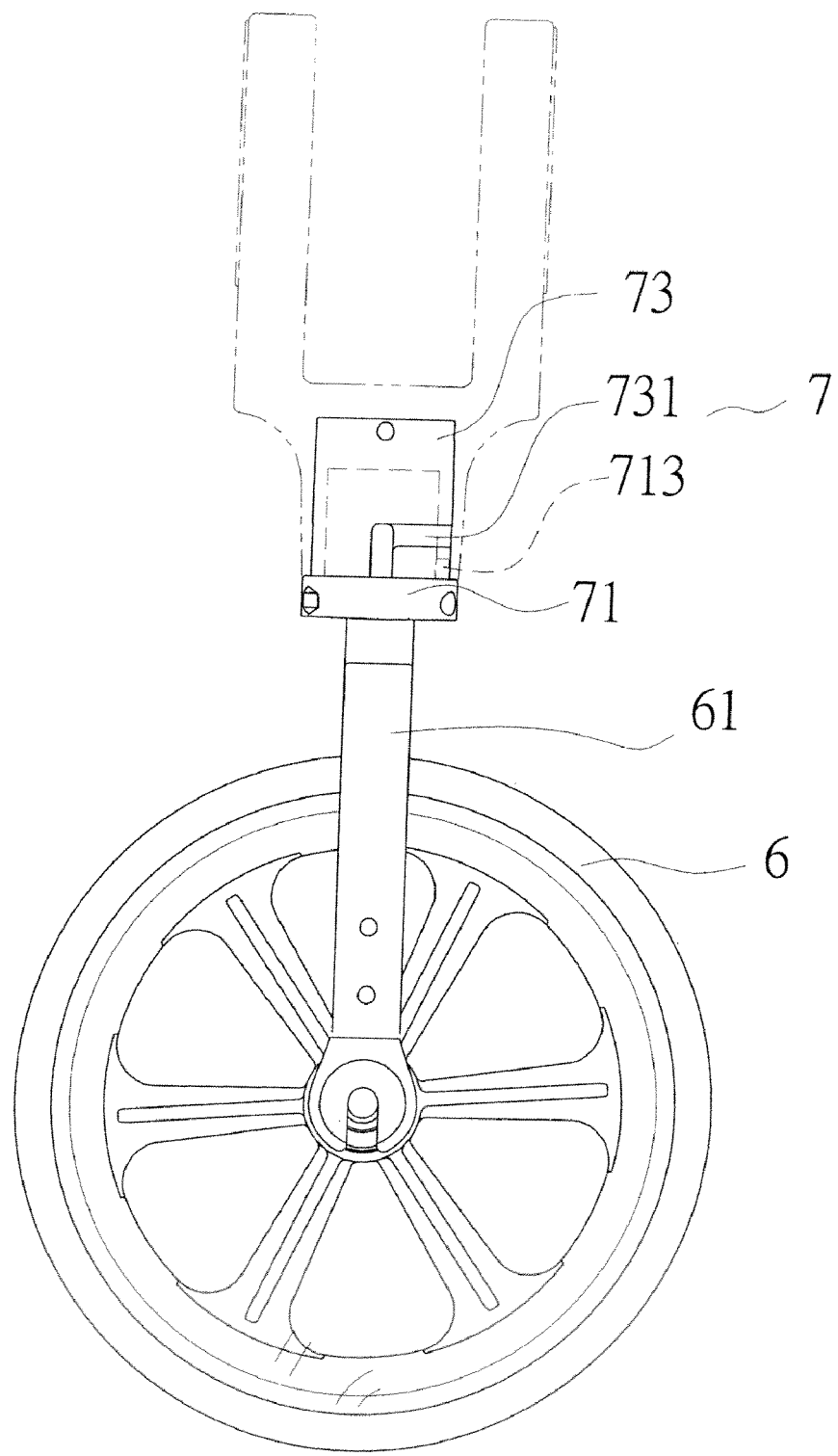
FIG. 10 is another schematic drawing showing a turning action of an embodiment according to the present invention.
Figure 11:
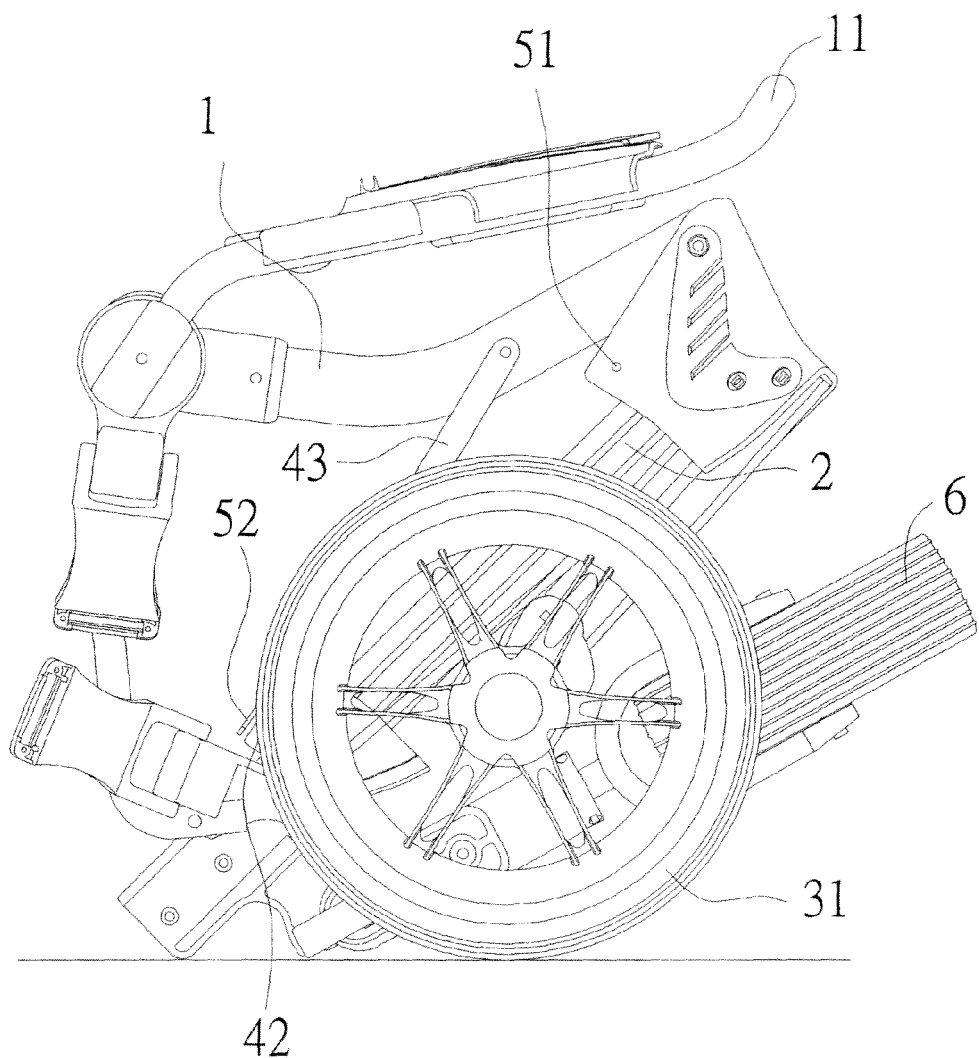
FIG. 11 is a schematic drawing showing an embodiment in a folded state according to the present invention.
Figure 12:
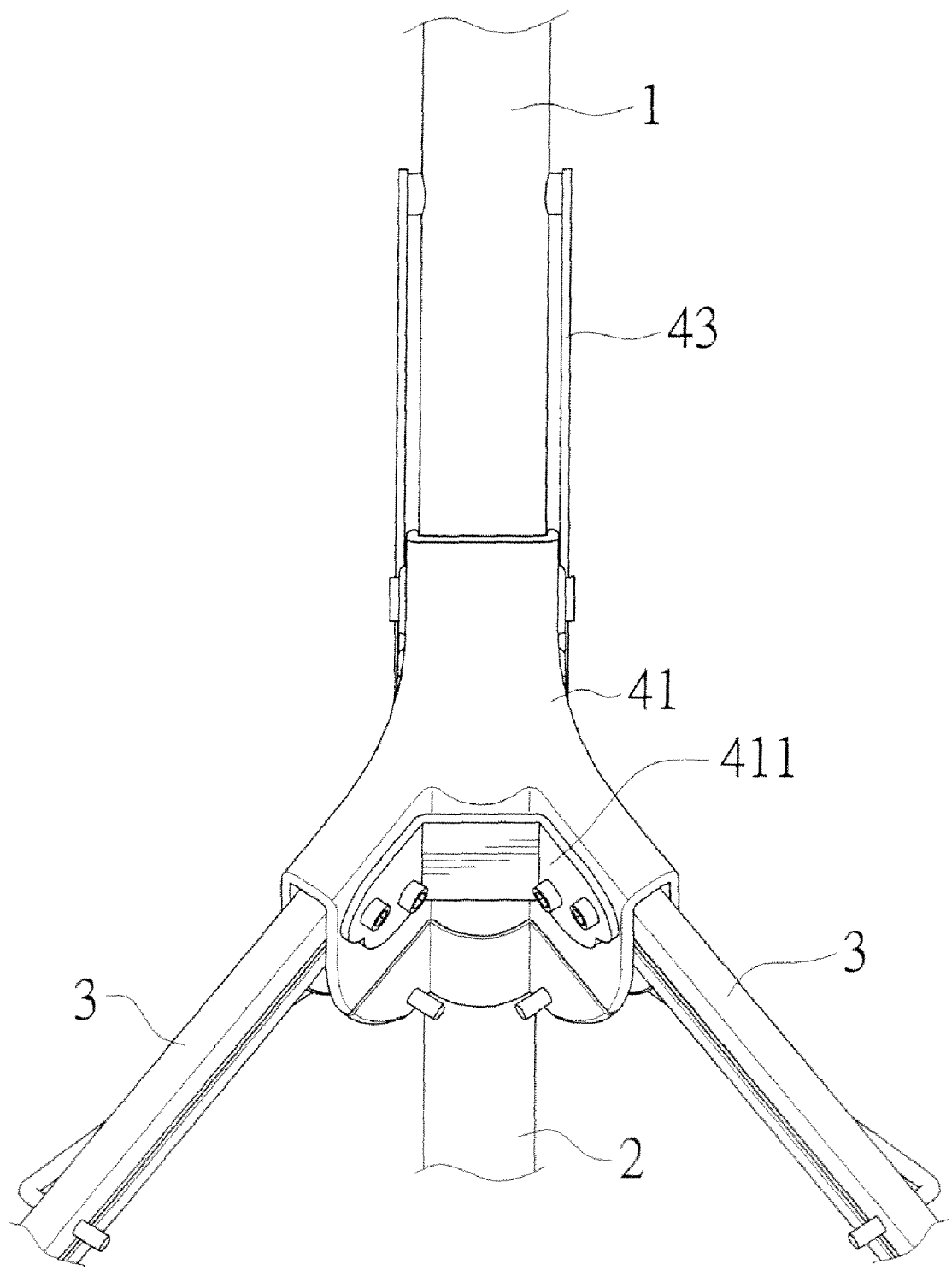
FIG. 12 is a schematic drawing showing a reinforcing structure of the present invention.
Figure 13:
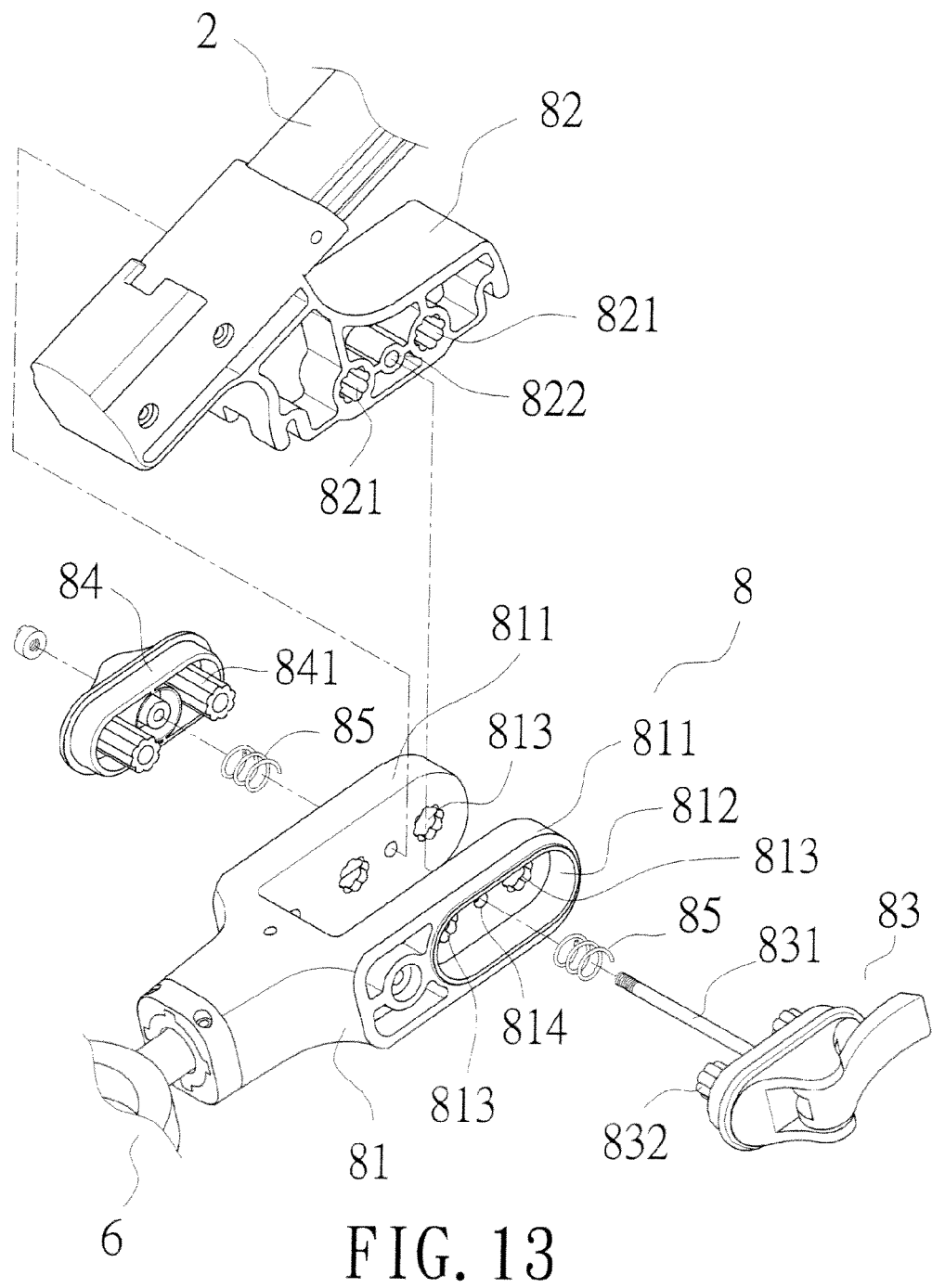
FIG. 13 is an explosive view of a bending member of an embodiment according to the present invention.
Figure 14:
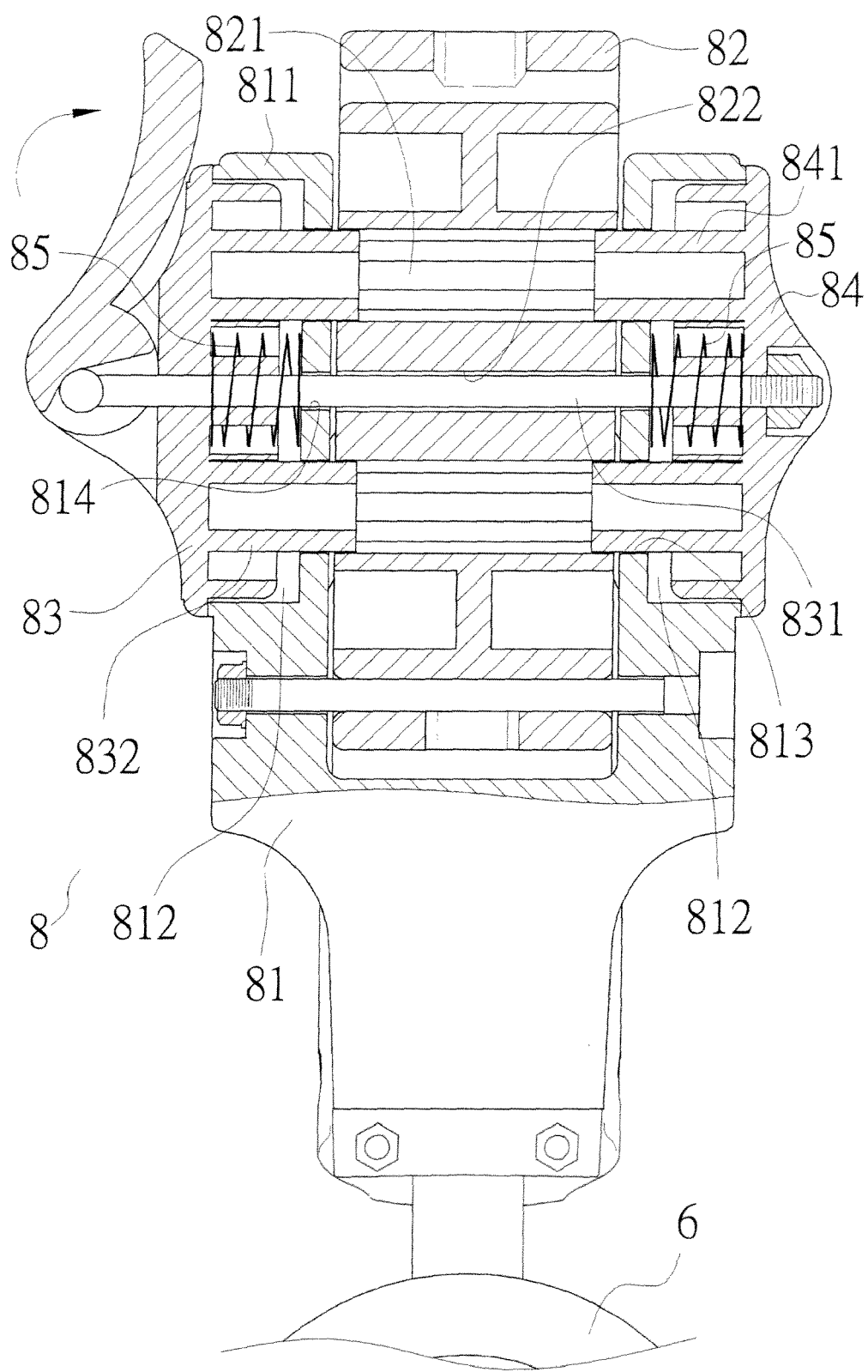
FIG. 14 is a schematic drawing showing a cross section of a bending member of an embodiment according to the present invention.
Figure 15:
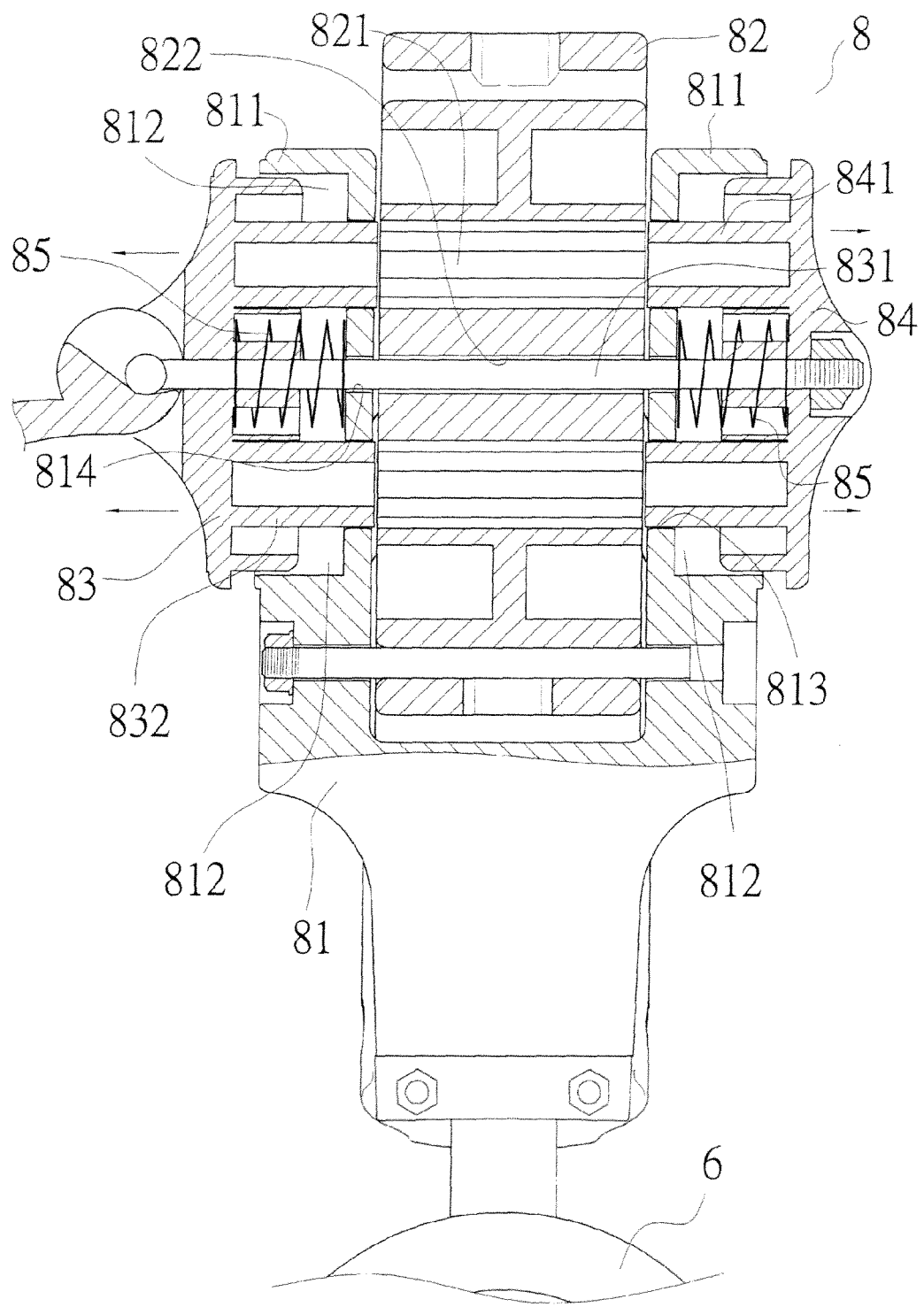
FIG. 15 is a schematic drawing showing a cross section of a bending member in action according to the present invention.
Figure 16:
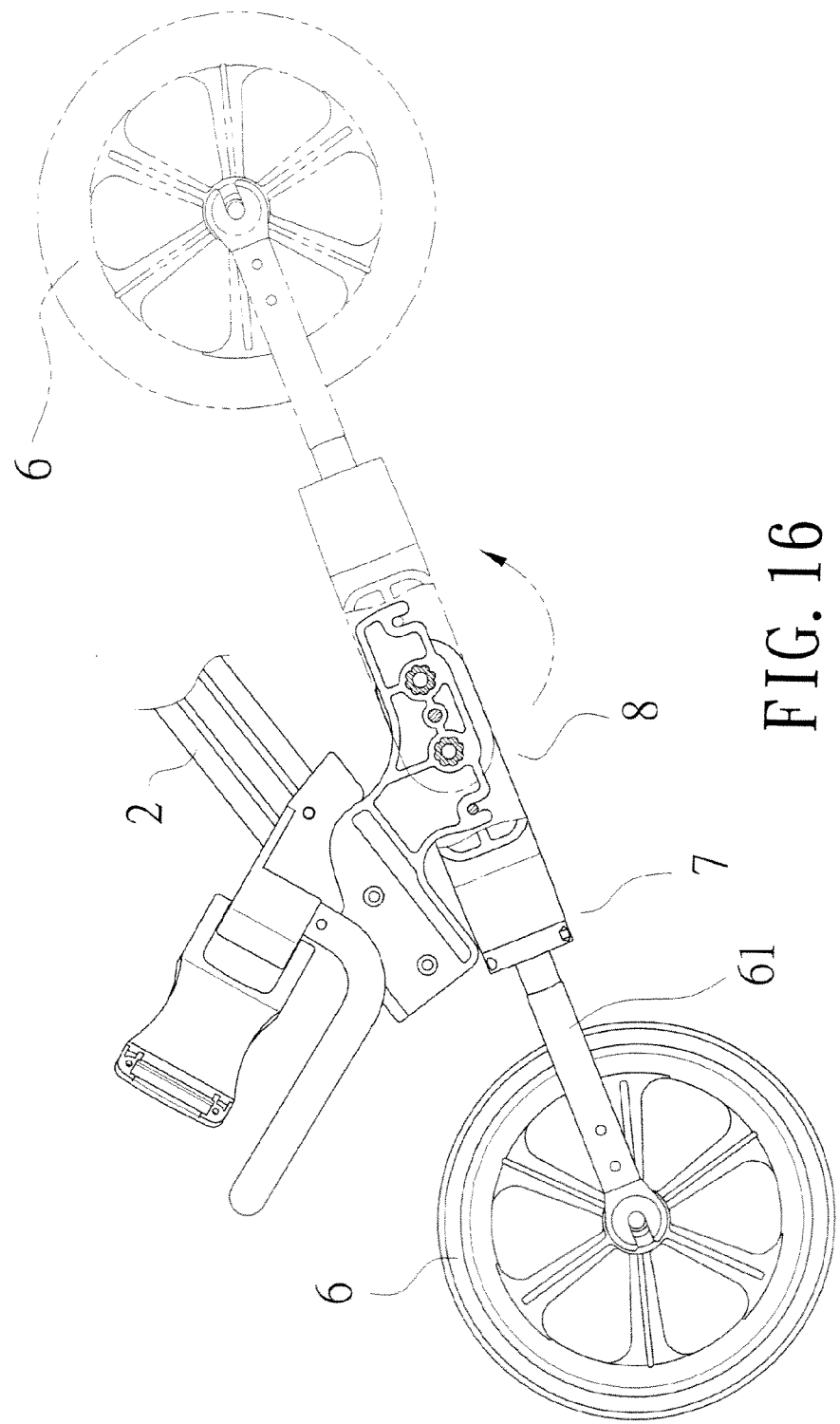
FIG. 16 is a schematic drawing showing a bending action of the present invention.
Figure 17:
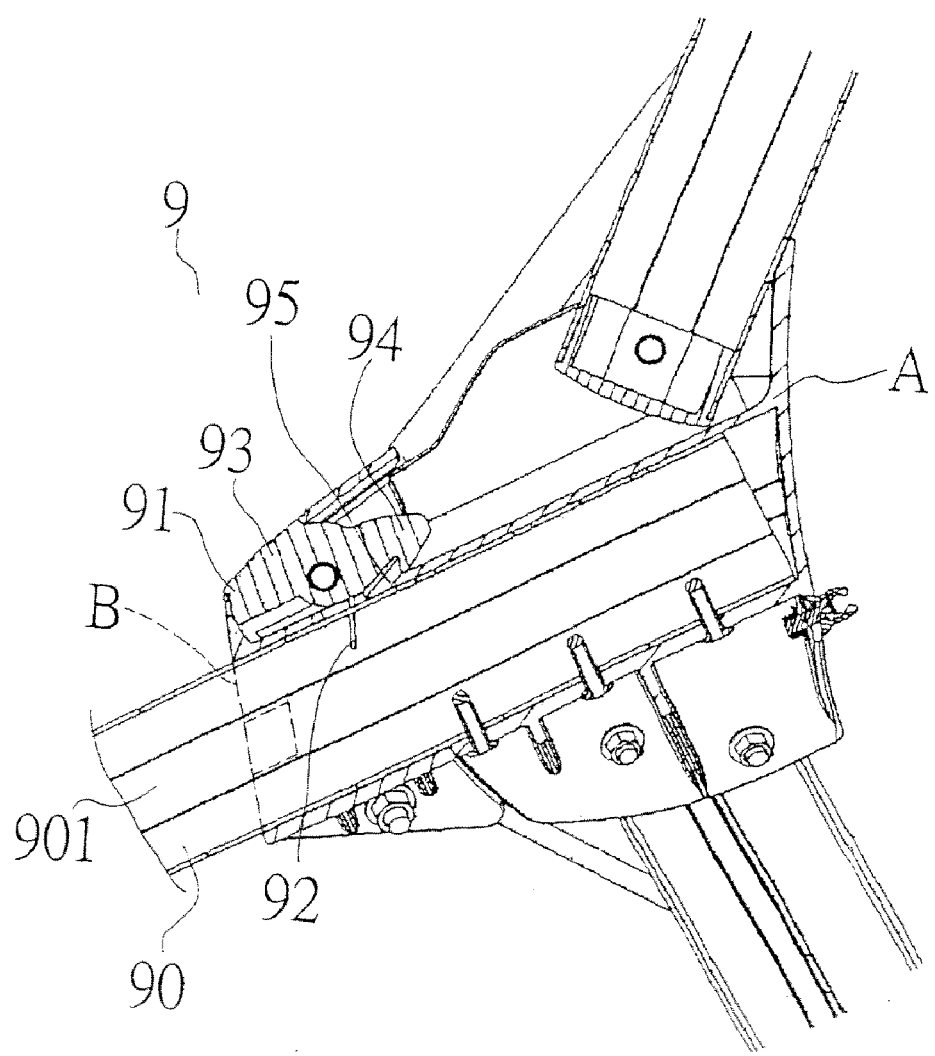
FIG. 17 is a schematic drawing showing a structure of a prior art available now.

Moreover, refer from FIG. 6 to FIG. 10, the turning member 7 is used to turn the front wheel 6 so as to reduce the volume and space for storage. The turning guiding slot 731 of the turning member 7 is C-shaped. When the golf trolley is extended, the locking protrusion 713 is on one end of the C-shaped turning guiding slot 731 in a fixed state. While turning the front wheel 6, the locking protrusion 713 of the shaft base 71 is pushed inward along the C-shaped turning guiding slot 731 and then along a horizontal portion of the C-shaped turning guiding slot 731 so as to turn the front wheel 6. Next, the shaft base 71 is pushed outward by the elastic body 72 and the locking protrusion 713 of the shaft base 71 is located on the other end of the C-shaped turning guiding slot 731, as shown in FIG. 10. Furthermore, refer to FIG. 12, a reinforcing rib 411 whose shape is similar to a surface of the connection base 41 is arranged under the connection base 41 so as to increase the strength of the extended golf trolley.

Refer from FIG. 13 to FIG. 16, while extending the front wheel 6, the front wheel 6 is connected to the lower frame 2 by the bending member 8. The bending member 8 includes a pivot base 81 connected to the front wheel 6 and arranged with two support rods 811, corresponding to each other. A groove 812 is disposed on an outer surface of each support rod 811. A surface of the groove 812 is arranged with locating holes 813 and an insertion hole 814. A base seat 82 arranged on the lower frame 2 is disposed between and connected with the two support rods 811. The base seat 82 is mounted with locating through holes 821 and an insertion hole 822 corresponding to the locating holes 813 and the insertion hole 814 respectively. The groove 812 of the two support rods 811 is respectively mounted with a lug wrench 83 and a connection block 84 correspondingly. The lug wrench 83 includes a rod 831 wrapped with an elastic part 85 and penetrating through the insertion hole 814 of the pivot base 81, the insertion hole 822 of the base seat 82 to be fixed on the connection block 84. Corresponding to the locating holes 813 of the two support rods 811, the lug wrench 83 and the connection block 84 respectively are disposed with locating prisms 832, 841. By the mounting of the locating prisms 832, 841 into the locating through holes 821 of the base seat 82, the extending/folding angle of the front wheel 6 is controlled. When the bending member 8 is not in use, the lug wrench 83 is in a fixed state and the locating prisms 832, 841 of the lug wrench 83 and of the connection block 84 are mounted into the locating through holes 821 so as to be in a locked state. When the lug wrench 83 is released, the elastic part 85 separates the lug wrench 83 from the connection block 84 elastically and the locating prisms 832, 841 are released from the locating through holes 821. Thus the pivot base 81 is moveable and bendable and the front wheel 6 can be extended or folded.

Compared with the structure available now, the present invention has following advantages:

1. By the locking body made of metal locked on the metal rod correspondingly, the fastening is precise and the location is stable. Thus the strength of the golf trolley in the extended state is improved. Moreover, the reinforcing rib whose shape is similar to the surface of the connection base is disposed under the connection base so as to increase the strength of the whole golf trolley.
2. Corresponding to two sides of the lower frame, guiding wheels are disposed on the connection block of the connection part. The guiding wheels slide and move in the guiding slots of the lower frame so as to reduce interfacial sliding resistance. Thus the extension and collapse of the golf trolley are smoother.
3. By the turning member that makes the front wheel turn and fold, located on a front end of the lower frame, the folding of the golf trolley is with smooth operation in a limited space and reduced volume for easy storage is achieved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A collapsible golf trolley comprising:
an upper frame disposed with a handle on a top thereof;
a lower frame arranged with two guiding slots on a surface thereof as well as a bending member on a rear end thereof;
each of two mounts disposed on each of two sides of the collapsible golf trolley and arranged with a side wheel;
a linkage having a connection base pivoted with the upper frame as well as the mount and being inserted with the lower frame, a connection block assembled on the lower frame and connecting with two guiding wheels by shafts so as to move and slide in each guiding slot of the lower frame correspondingly, each of two bars whose two ends being pivoted respectively on the upper frame and the connection block, and a pair of moveable linkage parts each of which is assembled between the connection block and the mount;
a fastener that includes a metal rod penetrated and assembled with the connection base, and a locking body pivoted on the connection block together with an elastic part while the locking body is locked on the metal rod correspondingly so as to connect the connection base with the connection block firmly;
a front wheel that is assembled with a fork correspondingly, is turned and foldable by a turning member for storage and having a bending member connected to a top end thereof; and
a turning member having a shaft base that is disposed on the fork of the front wheel and is formed by an inner tube, an outer tube and a pair of locking protrusions on a tube wall thereof; an elastic body arranged between the inner tube and the outer tube, and a sleeve base that is sleeved over the shaft base and is set with a pair of turning guiding slots each corresponding to one locking protrusion and allowing the locking protrusion sliding and turning therein; the sleeve base is connected to the bending member.

2. The device as claimed in claim 1, wherein a reinforcing rib whose shape is similar to a surface of the connection base is arranged under the connection base for increasing strength of the collapsible golf trolley.

3. The device as claimed in claim 1, wherein the bending member includes a pivot base connected to the front wheel and arranged with two corresponding support rods while each support rod is disposed with a groove on an outer surface thereof and a surface of the groove is arranged with locating holes and an insertion hole; a base seat arranged on the lower frame is disposed between and connected with the two support rods and the base seat is mounted with locating through holes and an insertion hole corresponding to the locating holes and the insertion hole respectively; the groove of the two support rods is respectively mounted with a lug wrench and a connection block correspondingly while the lug wrench includes a rod that is wrapped with an elastic part and is penetrating through the insertion hole of the pivot base, the insertion hole of the base seat to be fixed on the connection block; the lug wrench and the connection block respectively are disposed with locating prisms corresponding to the locating holes of the two support rods so that the extending and folding of the front wheel is controlled by the mounting of the locating prisms into the locating through holes of the base seat.

\* \* \* \* \*